United States Patent
Petri

(10) Patent No.: US 8,108,768 B2
(45) Date of Patent: Jan. 31, 2012

(54) IMPROVING EFFICIENCY OF CONTENT RULE CHECKING IN A CONTENT MANAGEMENT SYSTEM

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 11/780,590

(22) Filed: Jul. 20, 2007

(65) Prior Publication Data

US 2009/0024640 A1    Jan. 22, 2009

(51) Int. Cl.
G06F 17/21    (2006.01)
(52) U.S. Cl. ........................................................ 715/237
(58) Field of Classification Search ................ 715/237
See application file for complete search history.

(56) References Cited

U.S. PATENT DOCUMENTS

| | | | |
|---|---|---|---|
| 7,747,945 B1 * | 6/2010 | Babka et al. ................. | 715/237 |
| 2004/0006744 A1 * | 1/2004 | Jones et al. .................. | 715/514 |
| 2004/0172590 A1 * | 9/2004 | Rothschiller et al. ......... | 715/503 |
| 2004/0177321 A1 * | 9/2004 | Brown et al. ................. | 715/513 |
| 2004/0226002 A1 * | 11/2004 | Larcheveque et al. ........ | 717/126 |
| 2004/0255243 A1 * | 12/2004 | Vincent, III ................... | 715/513 |
| 2005/0060281 A1 * | 3/2005 | Bucher et al. ................. | 707/1 |
| 2005/0060317 A1 * | 3/2005 | Lott et al. ...................... | 707/10 |
| 2005/0091404 A1 * | 4/2005 | Chevanne et al. ............. | 709/246 |
| 2005/0091581 A1 * | 4/2005 | Bezrukov et al. ............. | 715/513 |
| 2005/0102612 A1 * | 5/2005 | Allan et al. .................... | 715/513 |
| 2005/0154983 A1 * | 7/2005 | Hailey et al. .................. | 715/530 |
| 2005/0228818 A1 * | 10/2005 | Murthy et al. ................. | 707/102 |
| 2005/0289446 A1 * | 12/2005 | Moncsko et al. .............. | 715/501.1 |
| 2006/0004729 A1 * | 1/2006 | Zhilyaev et al. ............... | 707/3 |
| 2006/0036612 A1 * | 2/2006 | Harrop et al. ................. | 707/100 |
| 2006/0167929 A1 * | 7/2006 | Chakraborty et al. ........ | 707/102 |
| 2006/0195413 A1 * | 8/2006 | Davis et al. .................... | 707/1 |

(Continued)

OTHER PUBLICATIONS

IBM DB2 Version 9 XML Guide, 2006, pp. 1-369.
EMC Documentum, "XML Application Development Guide" Version 5.3 Mar. 2005, pp. 1-373.
Pierre Geneves, "Improving Efficiency of Xpath-Based XML Querying", pp. 1-8, Mar. 8, 2004.
Pierre Geneves, Improving Efficiency of XPath-based XML Querying, INRIA Rhone-Alpes, Mar. 8, 2004, http://wam.inrialpes.fr/publications/2004/toward-xpath-efficiency.pdf.

*Primary Examiner* — Laurie Ries
*Assistant Examiner* — Frank D Mills
(74) *Attorney, Agent, or Firm* — Martin & Associates LLC; Derek P. Martin

(57) ABSTRACT

A content management system (CMS) includes information in a document that correlates each element for which a content rule needs to be checked with the corresponding content rule. By including information in the document regarding which content rules apply to the elements in the document, the CMS does not process any rules that do not apply to the document. When the document is checked into the CMS repository, only the content rules specified in the document are checked. An editor allows checking an element against the content rules as a document is created. If the editor is on a client computer system, and the editor checks all content rules that correspond to the elements in a document, the document may be modified to indicate the checking of the content rules has already been performed, which allows the CMS to write the document to the repository without checking the content rules.

4 Claims, 13 Drawing Sheets

U.S. PATENT DOCUMENTS

| | | | |
|---|---|---|---|
| 2006/0206502 A1* | 9/2006 | Gaurav et al. | 707/100 |
| 2006/0206503 A1* | 9/2006 | Gaurav et al. | 707/100 |
| 2006/0206523 A1* | 9/2006 | Gaurav et al. | 707/104.1 |
| 2007/0094199 A1* | 4/2007 | Deshpande et al. | 706/47 |
| 2007/0101259 A1* | 5/2007 | Grigoriadis et al. | 715/517 |
| 2008/0005132 A1* | 1/2008 | Herbeck et al. | 707/100 |
| 2008/0040397 A1* | 2/2008 | Herbeck et al. | 707/201 |
| 2008/0091703 A1* | 4/2008 | Murthy | 707/102 |
| 2008/0222178 A1* | 9/2008 | Petri | 707/101 |
| 2008/0222183 A1* | 9/2008 | Petri | 707/102 |
| 2008/0244382 A1* | 10/2008 | Petri | 715/237 |
| 2008/0313120 A1* | 12/2008 | Kumbi et al. | 706/47 |

* cited by examiner

```
<tree:Tree baseUrl="" name="sample_tree" xmlns:tree="http://www.ibm.com/tree"
    xmlns:xhtml="http://www.w3.org/1999/xhtml">
    <tree:Node container="true" virtualChildren="false">
        <tree:Label>Node 1</tree:Label>
        <tree:Node container="true" virtualChildren="false">
            <tree:Label>Node 1-1</tree:Label>
            <tree:Node container="false">
                <tree:label>Node 1-1-1</tree:Label>
            </tree:Node>
            <tree:Node container="false">
                <tree:Label>Node 1-1-2 <xhtml:img src="images/folder.gif"
                alt="folder icon"/></tree:Label>
            </tree:Node>
        </tree:Node>
        <tree:Node xmlns:tree="http://www.ibm.com/tree" container="true"
    virtualChildren="false">
            <tree:Label>Node 1-2</tree:Label>
            <tree:Node container="false">
                <tree:Label>Node 1-2-1</tree:Label>
            </tree:Node>
            <tree:Node container="false">
                <tree:Label>Node 1-2-2</tree:Label>
            </tree:Node>
        </tree:Node>
    </tree:Node>
</tree:Tree>
```

FIG. 3    Prior Art

```
<Synchronization>
    <Bidirectional attribute="name" contentXPath="/tree:Tree/attribute::name" />
    <AttributeToContent contentXPath="/tree:Tree/tree:Node/attribute::container">
        <Variables>
            <VariableDeclaration name="isRootNodeContainer"><Attribute
       attribute="is_root_node_container" /></VariableDeclaration>
        </Variables>
        <Content><Variable name="isRootNodeContainer" /></Content>
    </AttributeToContent>
    <ContentToAttribute attribute="description">
        <Variables>
            <VariableDeclaration name="hasVirtualChildren"><Attribute
attribute="has_virtual_children" /></VariableDeclaration>
            <VariableDeclaration name="nodeName"><ContentXPath xPath="/tree:Tree/
       tree:Node/child::tree:Label/text()" /></VariableDeclaration>
        </Variables>
        <Content>
            This node has virtual children:
            <Variable name="hasVirtualChildren" />
            The title of this node is:
            <Variable name="nodeName" />
        </Content>
    </ContentToAttribute>
</Synchronization>
```

FIG. 4   Prior Art

```
<Bursting>
    <ObjectMappingRule contentXPath="/tree:Tree/tree:Node/
tree:Node[child::Label='Node 1-2']" doctypeRef="tree_node"
        initialStateType="in_progress" lifecycleType="1"
type="automatic"version="CURRENT">
        <Variables>
            <VariableDeclaration name="nodeName"><ContentXPath xPath="/
        tree:Tree/tree:Node/tree:Node[child::tree:Label='Node 1-2']/text()" />
            </VariableDeclaration>
        </Variables>
    </ObjectMappingRule>
</Bursting>
```

FIG. 5    Prior Art

```
<Linking>
    <ObjectMappingRule
        contentXPath="/tree:Tree/tree:Node/tree:Node/tree:Node[child::Label='Node 1-1-2']/
    tree:Label/xhtml:img/attribute::src" doctypeRef="gif_image"
initialStateType="steady_state" lifecycleType="2" type="automatic"
version="CURRENT">
        </ObjectMappingRule>
</Linking>
```

FIG. 6    Prior Art

```
<tree:Tree baseUrl="" name="sample_tree" xmlns:tree="http://www.ibm.com/tree"
      xmlns:xhtml="http://www.w3.org/1999/xhtml">
      <tree:Node container="true" virtualChildren="false">
            <tree:Label><img source="/lbl_img.gif" /></tree:Label>
      </tree:Node>
</tree:Tree>
```

FIG. 7    Prior Art

| Number of Content Rules | Number of Matches |
|---|---|
| 5 | 5 |

FIG. 8    Prior Art

| Number of Content Rules | Number of Matches |
|---|---|
| 5 | 3 |

FIG. 9    Prior Art

| Element | Content Rule(s) |
|---|---|
| A | M |
| B | |
| C | |
| D | N, O |
| Rules Checked = FALSE | |

```
<xsd:schema xmlns:xsd="http://www.w3.org/2001/XMLSchema">
    <xsd:element name="elem1" type="xsd:string"/>
    <xsd:element name="elem2" type="xsd:string"/>
    <xsd:element name="elem3" type="xsd:string"/>
    <xsd:element name="root">
        <xsd:complexType>
            <xsd:sequence>
                <xsd:element ref="elem1" minOccurs="0" maxOccurs="1"/>
                <xsd:element ref="elem2" minOccurs="0" maxOccurs="1"/>
                <xsd:element ref="elem3" minOccurs="0" maxOccurs="1"/>
            </xsd:sequence>
        </xsd:complexType>
    </xsd:element>
</xsd:schema>
```

FIG. 16

```
<xc:XMLContentRules xmlns:xc="http://com.ibm.lifesci.score.XMLContentRules"
    xmlns:xsi="http://www.w3.org/2001/XMLSchema-instance"
    xsi:schemaLocation="http://com.ibm.lifesci.score.XMLContentRules    XMLContentRules.xsd ">
    <Bursting>
        <ObjectMappingRule contentXPath="/root/elem2" name="burst_elem2"
doctypeRef="elem2_node" initialStateType="in_progress" lifecyclEType="1" type="automatic" version="CURRENT">
        </ObjectMappingRule>
    </Bursting>
</xc:XMLContentRules>
```

FIG. 17

```
<xsd:schema xmlns:xsd="http://www.w3.org/2001/XMLSchema">
    <xsd:element name="elem1" />
    <xsd:element name="elem2">
        <xsd:annotation>
            <xsd:appinfo>
                <ContentRule ref="burst_elem2" />
            </xsd:appinfo>
        </xsd:annotation>
    </xsd:element>
    <xsd:element name="elem3" type="xsd:string" />
    <xsd:element name="root">
        <xsd:complexType>
            <xsd:sequence>
                <xsd:element ref="elem1" minOccurs="1" maxOccurs="1" />
                <xsd:element ref="elem2" minOccurs="1" maxOccurs="1" />
                <xsd:element ref="elem3" minOccurs="1" maxOccurs="1" />
            </xsd:sequence>
        </xsd:complexType>
    </xsd:element>
</xsd:schema>
```
} 1810

FIG. 18

```
<root xmlns:xsi="http://www.w3.org/2001/XMLSchema-instance"
    xsi:noNamespaceSchemaLocation="SampleSchema.xsd">
    <elem1>elem1 content</elem1>
    <elem2>
        <ProcessingResults>
            <BurstingResults>
                <!-- Details omitted for sake of brevity. This element defines how
        the object should be imported into the repository (i.e. this element
        should contain the initial CMS metadata values to facilitate an
import)-->
            </BurstingResults>
        </ProcessingResults>
        elem2 content
    </elem2>
    <elem3>elem3 content</elem3>
</root>
```

FIG. 19

IMPROVING EFFICIENCY OF CONTENT RULE CHECKING IN A CONTENT MANAGEMENT SYSTEM

BACKGROUND

1. Technical Field

This disclosure generally relates to content management systems, and more specifically relates to rule checking in a content management system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

Known content management systems check their rules when content comes into or out of the system. If a rule is satisfied, the CMS may perform subsequent processing on the content. Known content management systems may include rules related to bursting, linking, and synchronization. Bursting rules govern how a document is bursted, or broken into individual chunks, when the document is checked into the repository. By bursting a document into chunks, the individual chunks may be potentially reused later by a different author. Linking rules are used for importing and associating objects related to a CMS document based on particular elements or attributes from the document as specified by the rules. For example, an XML document that references external images can take advantage of linking rules so that relationships between the XML content and the external images are automatically created when the document is imported or checked into the repository. Another kind of linking rule governs what content in a repository a user may link to in a document that will be subsequently checked into the repository. Synchronization rules govern synchronization between content and metadata related to the content. For example, a synchronization rule may specify that whenever a specified CMS attribute is changed, a particular piece of XML in the content should be automatically updated with that attribute's value.

Current techniques for using these rules to process XML data are inefficient. In the prior art, the entire XML source document must be read into memory, and all of the content rules are evaluated against the source document each time the document is imported or checked into the repository. Even if the source document does not contain content pertaining to the rules, all of the content rules are evaluated against the source document, which requires processor capacity and thus decreases system performance. As the size of the XML source documents increase, the performance of the system will decrease proportionally. Without a way to avoid loading an entire source document into memory and checking all of the content rules against all of the document, the computer industry will continue to suffer from decreased performance as the size of documents and the number of content rules increases.

BRIEF SUMMARY

A content management system (CMS) includes information in a document that correlate each element for which a content rule needs to be checked with the corresponding content rule. By including information in the document regarding which content rules apply to the elements in the document, the CMS does not process any rules that do not apply to the document. When the document is checked into the CMS repository, only the content rules specified in the document are checked. An editor allows checking an element against the content rules as a document is created. If the editor is on a client computer system, and the editor checks all content rules that correspond to the elements in a document, the document may be modified to indicate the checking of the content rules has already been performed, which allows the CMS to write the document to the repository without checking the content rules. The result is a CMS that efficiently processes document content against the content rules in a way that does not waste system resources checking rules that need not be checked.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 3 shows a sample XML source document to illustrate the prior art method of FIG. 2;

FIG. 4 shows a sample set of synchronization rules that are part of the content rules to illustrate the prior art method of FIG. 2;

FIG. 5 shows a sample set of bursting rules that are part of the content rules to illustrate the prior art method of FIG. 2;

FIG. 6 shows a sample set of linking rules that are part of the content rules to illustrate the prior art method of FIG. 2;

FIG. 7 shows a sample XML source document that is more simple than the sample XML source document in FIG. 3 to illustrate the deficiencies of the prior art;

FIG. 8 is a table showing the number of content rules and the resulting matches from processing the sample XML source document in FIG. 3 with the rules in FIGS. 4-6;

FIG. 9 is a table showing the number of content rules and the resulting matches from processing the sample XML source document in FIG. 7 with the rules in FIGS. 4-6;

FIG. 16 is a sample XML schema to illustrate one suitable implementation;

FIG. 17 is a sample set of content rules that are associated with the sample schema shown in FIG. 16;

FIG. 18 shows an example of the schema in FIG. 16 being modified by mapping the content rules to elements in the schema; and FIG. 19 is the sample XML source document based on the modified schema after being edited on a client that has a CMS rule checking mechanism.

DETAILED DESCRIPTION

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
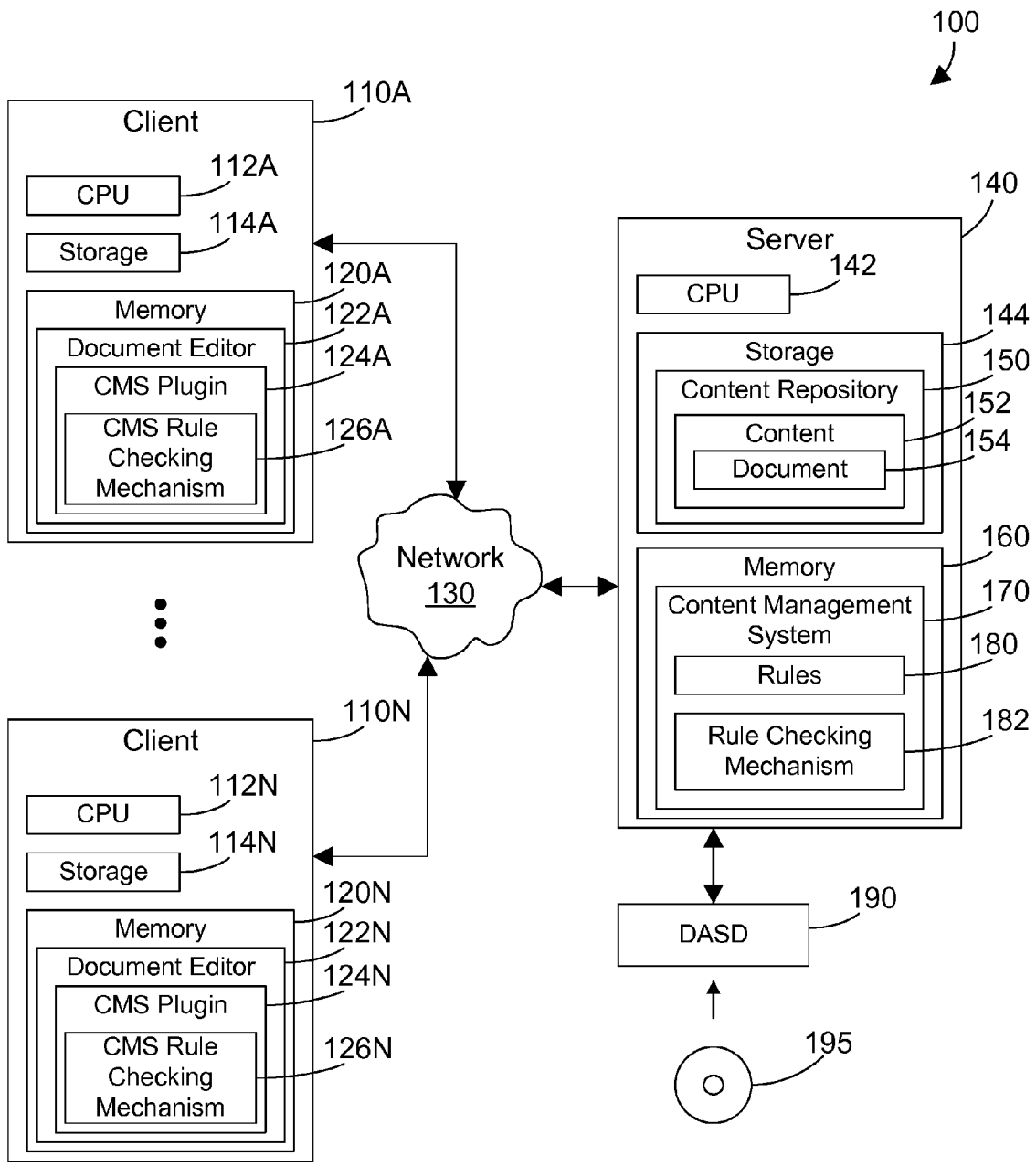
FIG. 1 is a block diagram of a networked computer system that includes a server computer system that has a content management system that includes a rule checking mechanism, and includes a plurality of client computer systems that each have a document editor that includes a CMS rule checking mechanism.

Referring to FIG. 1, networked computer system 100 includes multiple clients, shown in FIG. 1 as clients 110A, . . . , 110N, coupled to a network 130. Each client preferably includes a CPU, storage, and memory that contains a document editor, a content management system (CMS) plugin, and a CMS rule checking mechanism. Thus, client 110A includes a CPU 112A, storage 114A, memory 120A, a document editor 122A in the memory 120A that is executed by the CPU 112A, a CMS plugin 124A that allows the document editor 122A to interact with content 152 in the repository 150 that is managed by the CMS 170 in server 140, and a CMS rule checking mechanism 126A that enforces content rules on each element added to a document via the document editor. In similar fashion, other clients have similar components shown in client 110A, through client 110N, which includes a CPU 112N, storage 114N, memory 120N, a document editor 122N, a CMS plugin 124N, and a CMS rule checking mechanism 126N.

The CMS 170 resides in the main memory 160 of a server computer system 140 that also includes a CPU 142 and storage 144 that includes a content repository 150 that holds content 152 managed by the CMS 170. Content 152 may include one or more documents 154. As used in the disclosure and claims herein, the term "document" means any type of data that may be managed by a content management system, including all known types of data and objects as well as those developed in the future. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes rules 180, and a rule checking mechanism 182. Rules 180 include bursting rules, linking rules, and synchronization rules. Of course, other rules, whether currently known or developed in the future, could also be included in rules 180. Rule checking mechanism 182 is used to determine if the document being checked into the CMS has had the content rules already checked against its content, and to check the content rules against the document content if the document content has not been checked.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The CMS herein may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
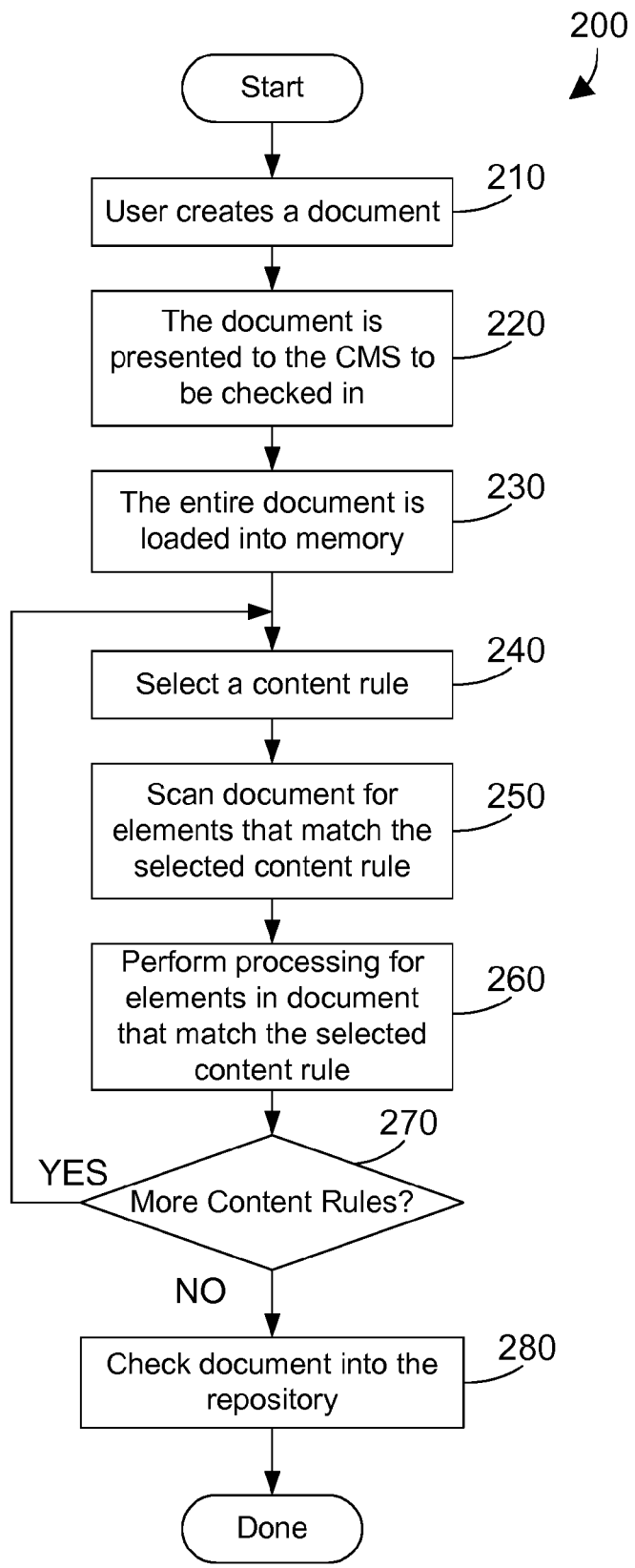
FIG. 2 is a flow diagram of a prior art method for evaluating content rules against a document.

Referring to FIG. 2, a prior art method 200 for evaluating content rules against a document begins by a user creating a document (step 210). The document is then presented to the CMS to be checked in to the repository (step 220). The entire document is loaded into memory (step 230). A content rule is selected (step 240). Then the document is scanned for elements that match the selected content rule (step 250), and processing is performed for elements in the document that match the selected content rule (step 260). If there are more content rules that need to be checked against the document (step 270=YES) then method 200 returns to select a content rule (step 240). If there are no more content rules that need to be checked against the document (step 270=NO) then the document is checked into the repository (step 280) and method 200 is done.

A simple example is given in FIGS. 3-9 to illustrate the function of prior art method 200 shown in FIG. 2 and the problems associated with the prior art. To test the content management functionality, a simple "Tree" grammar was developed. A sample tree source document is shown in FIG. 3, and the associated content rules are shown in FIGS. 4-6. FIG. 4 shows three synchronization rules, FIG. 5 shows one bursting rule, and FIG. 6 shows one linking rule associated with the sample tree source document shown in FIG. 3. When the user checks in the source document in FIG. 3, the CMS will iterate through the content rules in FIGS. 4-6 and subsequently query the source document for matching elements. This approach works well when the source document contains most or all of the content described by the rules, as is shown in the sample tree source document shown in FIG. 3. However, when the source document contains little or no content that matches the rules, then the CMS will perform unnecessary queries against the source document, as is shown in the sample tree source document shown in FIG. 7. FIG. 8 shows a table of the number of content rules and resulting matches from processing the sample tree source document in FIG. 3 using the rules in FIGS. 4-6. Notice there are five relevant content rules and five matches to those rules. This is fairly efficient. However, using the same set of content rules, if we process the simpler source document in FIG. 7, there are five relevant content rules and only three matches to those rules as shown in FIG. 9. This means that checking two of the five rules against the elements in the source document in FIG. 7 was a waste of time. While the above examples are relatively simple, it is conceivable that XML processing could become very inefficient, especially when dealing with large grammars that contain several optional elements. And the problem would get progressively worse as the size of the source document increases when useless rules are evaluated against the entire document.

Figures 10, 11:
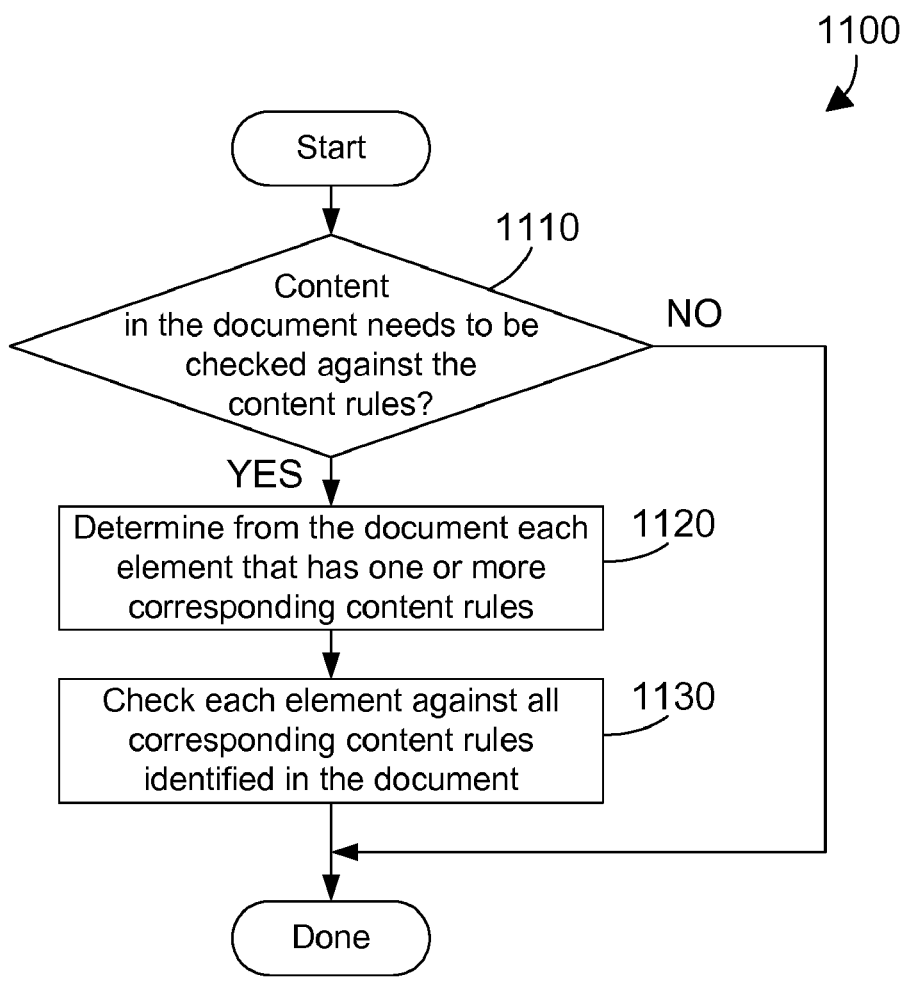
FIG. 10 is a sample representation of a document 154 shown in FIG. 1 that shows correlation of elements to corresponding content rules and shows metadata that indicates whether the checking of the document against the content rules has been performed previously.
FIG. 11 is flow diagram of a method for checking only the content rules identified in a document that correspond to elements in the document.

Referring to FIG. 10, one suitable example of a document 154 in the repository 150 in FIG. 1 includes elements and corresponding content rules, where applicable. Note there is not a one-to-one relationship between elements in the document 154 and content rules. In fact, an element may have no corresponding content rules, as entries 1020 and 1030 in FIG. 10 illustrate; an element may have one corresponding content rule, as entry 1010 in FIG. 10 illustrates; or an element may have multiple corresponding content rules, as entry 1040 in FIG. 10 illustrates. Document 154 may optionally include metadata such as shown at 1050 in FIG. 10 that indicates whether the content rules have already been checked. In entry 1050 in FIG. 10, the metadata indicates the rules have not been checked. However, the metadata may include any suitable information that may help to determine whether the content rules have been applied, including a timestamp of when they were applied, a version number of the rules, etc.

FIG. 11 shows a method 1100 that allows the CMS in FIG. 1 to only evaluate content rules that are identified in a document that correspond to elements in the document. If the content needs to be checked against the content rules (step 1110=YES), determine from the document each element that has one or more corresponding content rules (step 1120). Check each element against all corresponding content rules identified in the document (step 1130). Method 1100 is then done. Note if the content in the document does not need to be checked against the content rules (step 1110=NO), method 1100 does not check the content in the document.

Figure 12:
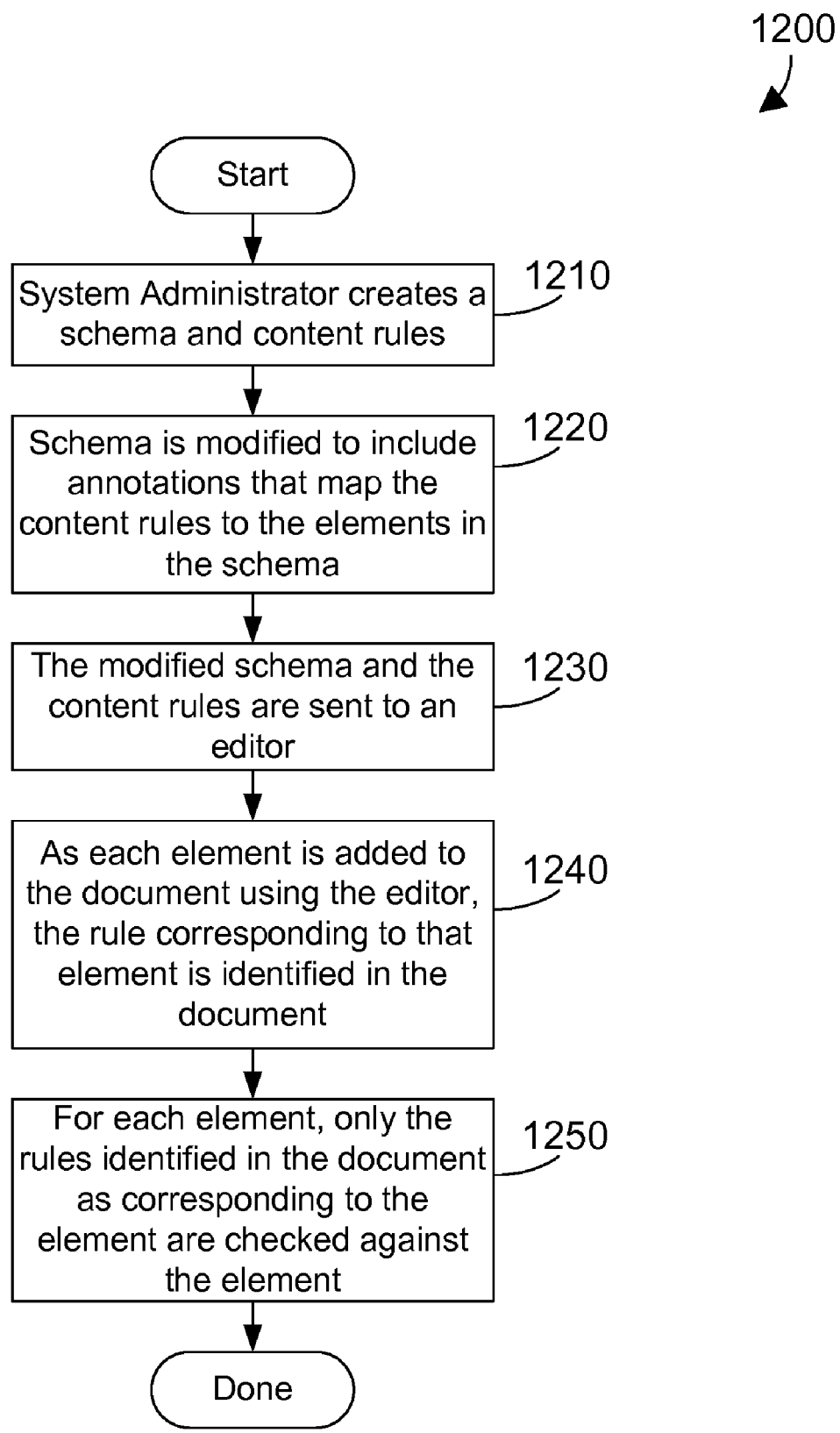
FIG. 12 is a flow diagram of a method for making rule checking more efficient.

An editor may also be used to check a document's elements against content rules as the document is being drafted. Referring to FIG. 12, a method 1200 for making rule checking more efficient starts with a system administrator creating a schema and a set of content rules (step 1210). The schema is modified to include annotations that map the content rules to the elements in the schema (step 1220). The modified schema and the content rules are sent to a client (step 1230). As each element is added to the document using the editor, the rule corresponding to that element (if one exists) is identified in the document (step 1240). This allows only the rules corresponding to each element to be checked against that element (step 1250) so that no time is wasted in evaluating rules that do not apply to the document.

Figure 13:
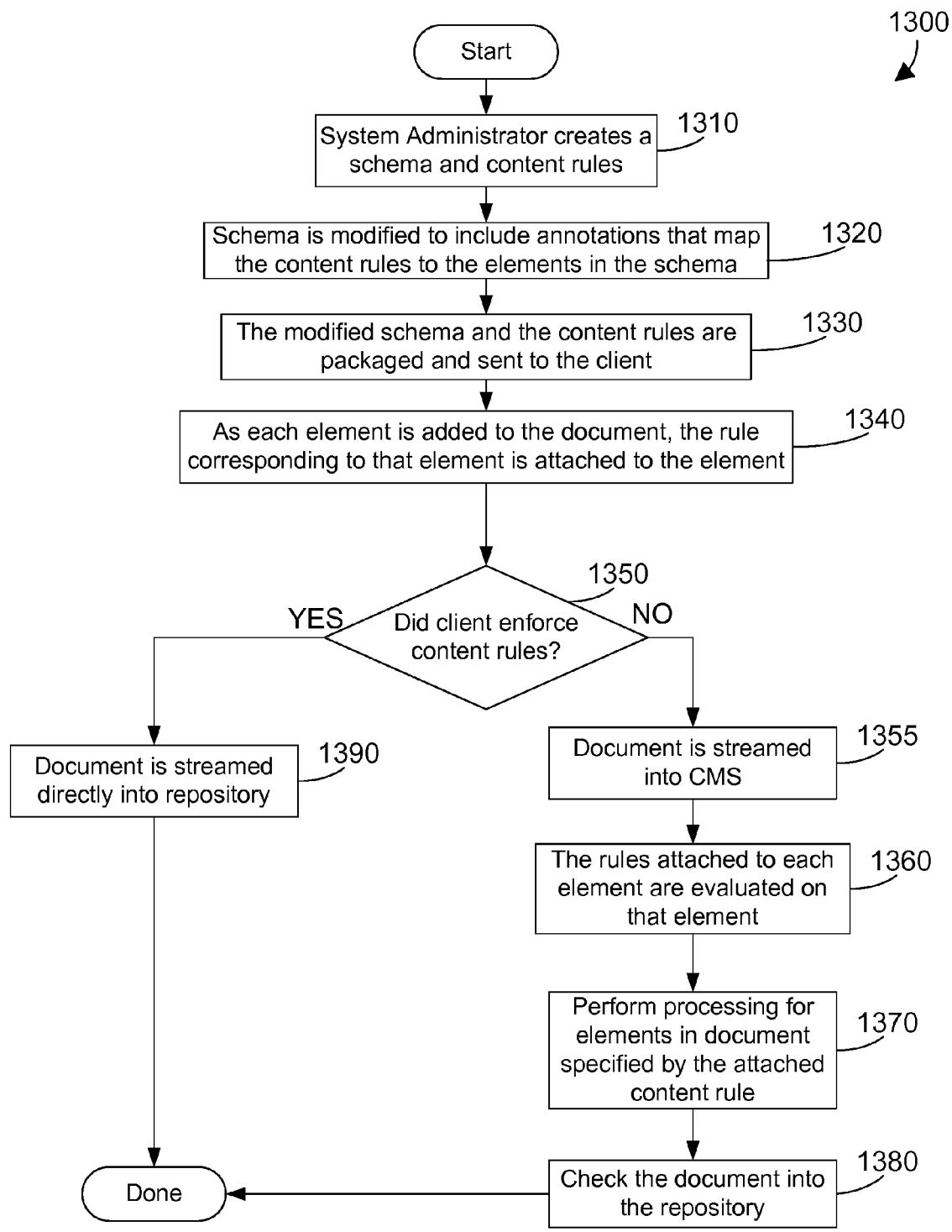
FIG. 13 is a flow diagram of a method for making rule checking more efficient when it is not known if the checking will be done by the client or the server.

Referring to FIG. 13, a method 1300 for making rule checking more efficient when it is not known if the rule checking will be done by a client or the CMS server begins with a system administrator creating a schema and set of content rules (step 1310). The schema is modified to include annotations that map the content rules to the elements in the schema (step 1320). The modified schema and the content rules are packaged and sent to a client (step 1330). As each element is added to the document, the rule corresponding to that element is attached to the element (step 1340). If the client enforced the content rules (step 1350=YES) then the document is streamed directly into the repository (step 1390) without the need of the CMS repeating the check of the content rules, and method 1300 is done. If the client did not enforce the content rules (step 1350=NO) then the document is streamed into the CMS (step 1355). Then the rules attached to each element are evaluated on that element (step 1360). Then processing is performed for elements in the document specified by the attached content rule (step 1370). The document is checked into the repository (step 1380), and method 1300 is done. One suitable way to know if the client enforced the content rules when the document was created is to include metadata in the document (such as metadata shown in entry 1050 in FIG. 10) that specifies whether the content has already been checked against the corresponding content rules. If the metadata indicates the content rules were previously enforced (step 1350=YES), the document may be checked into the repository without rechecking the document. If not (step 1350=NO), the document is first checked to see if its content needs to be processed according to the corresponding content rules, and if so, the document may be processed and then checked into the repository.

Figure 14:
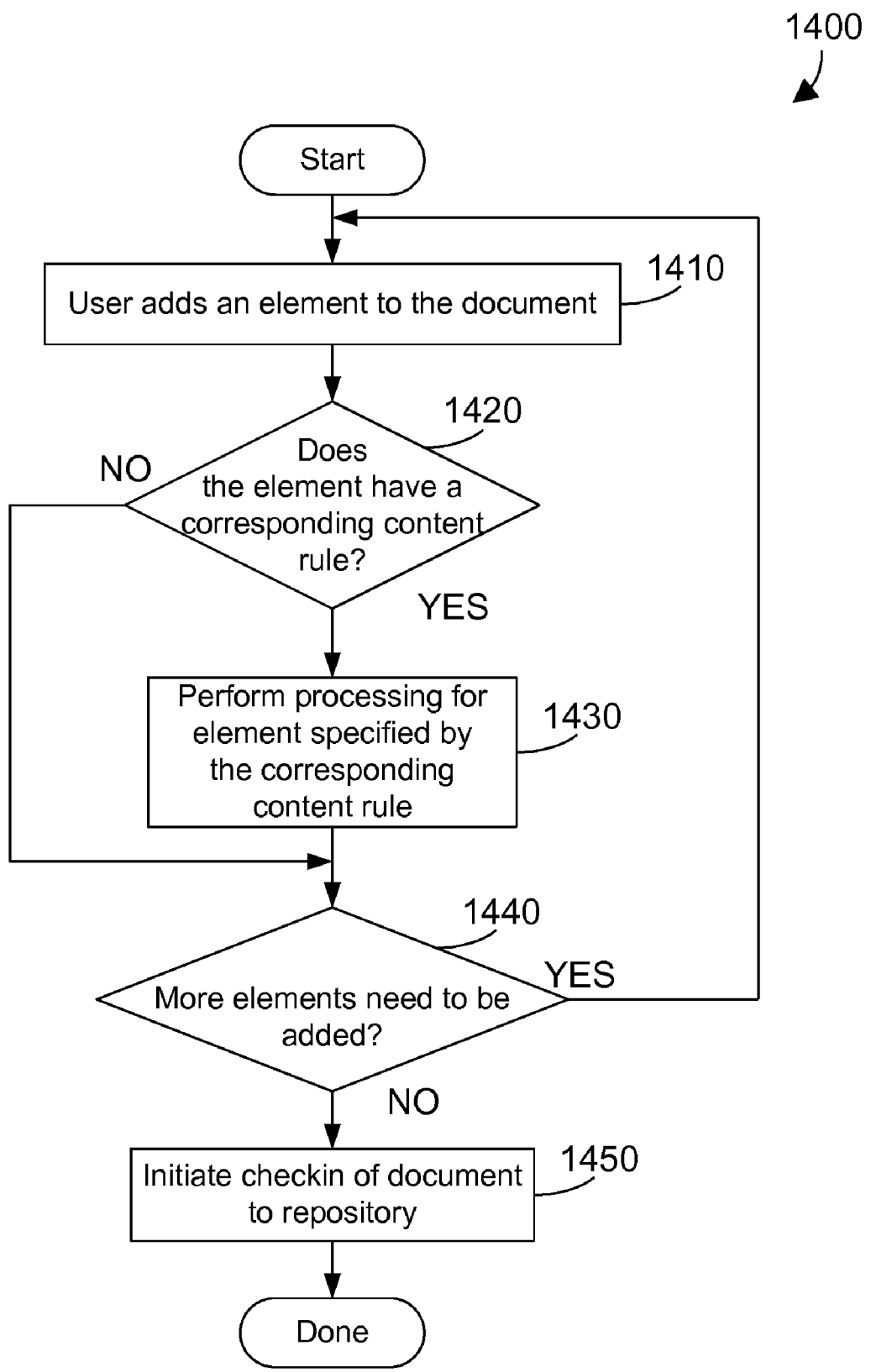
FIG. 14 is a flow diagram of a method when the client is performing rule checking.

Referring to FIG. 14, a method 1400 for the client to perform the rule checking begins with the user adding an element to a document (step 1410). If the element does not have a rule that corresponds to the added element (step 1420=NO) then method 1400 goes to step 1440. If no more elements need to be added to the document (step 1440=NO) then check-in of the document to the repository is initiated (step 1450) and method 1400 is done. If more elements need to be added to the document (step 1440=YES) then method 1400 starts over and waits for the user to add an element to the document (step 1410). If the element does have a content rule corresponding to the added element (step 1420=YES) then processing is performed for the element specified by the corresponding content rule (step 1430) and method 1400 goes to step 1440 to check if any more elements need to be added. Once no more elements need to be added (step 1440=NO), the checkin of the document to the CMS repository is initiated (step 1450).

Figure 15:
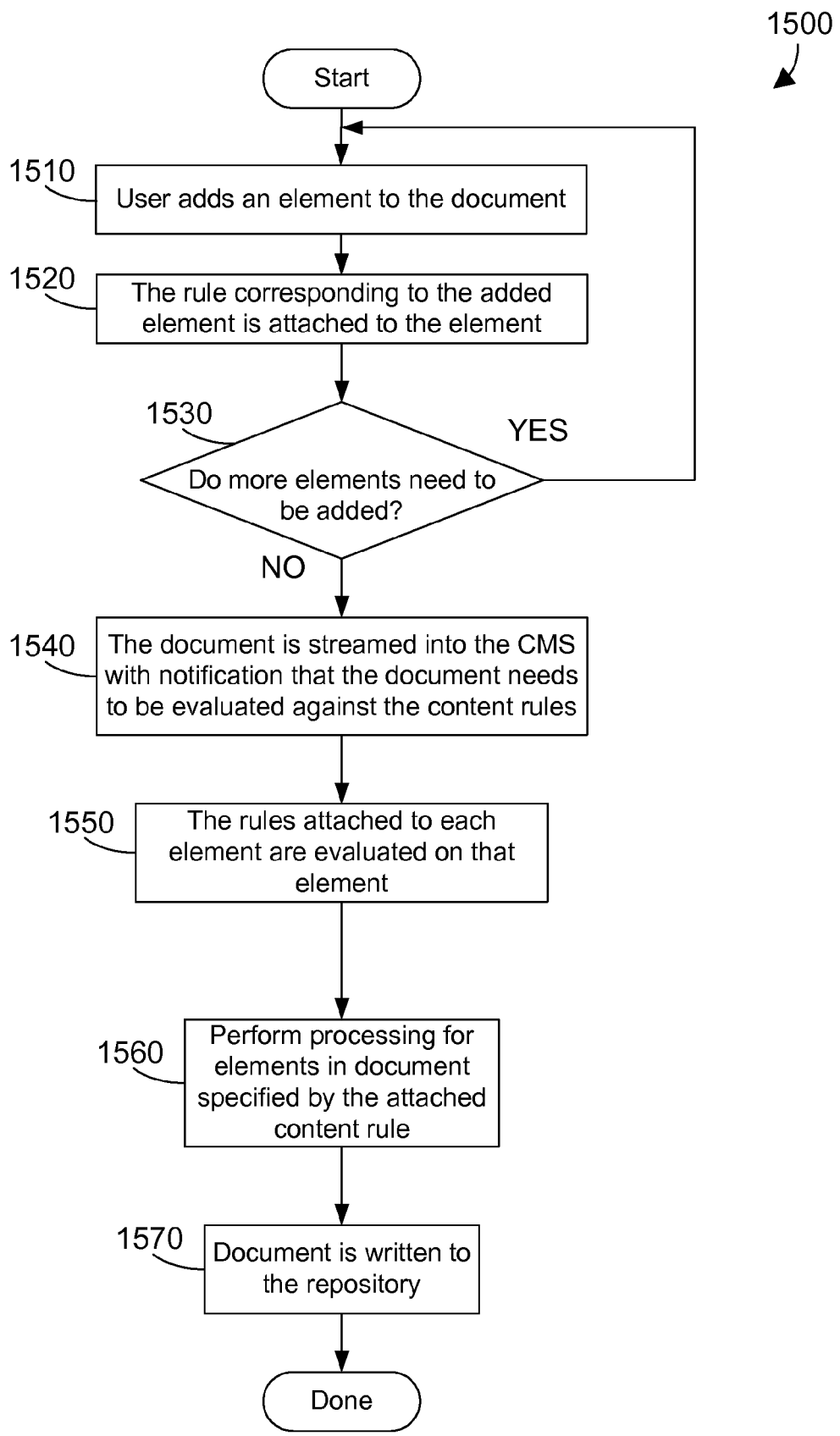
FIG. 15 is a flow diagram of a method when the server is performing rule checking.

Referring to FIG. 15, a method 1500 for the server to perform the rule checking begins with a user adding an element to a document (step 1510). The rule corresponding with the added element is attached to that element (step 1520). If there are no more elements that need to be added (step 1530=NO) then the document is streamed into the CMS with notification that the document needs to be evaluated against the content rules (step 1540). This notification could be in the form of metadata in the document, as shown in entry 1050 in FIG. 10. The rules attached to each element are then evaluated on that element (step 1550). Then processing specified by the attached content rule(s) is performed for corresponding elements in the document (step 1560), the document is written to the repository (step 1570) and method 1500 is done. If there are more elements that need to be added (step 1530=YES) then method 1500 returns to the beginning and waits for the user to add an element to the document (step 1510).

A simple example is now given for the sake of illustration. A system administrator creates a simple schema as is shown in FIG. 16. The system administrator also creates content rules, shown in FIG. 17, that are associated with the schema in FIG. 16. In the example content rules shown in FIG. 17, only one rule is defined to simplify the example. The rule is defined to match the "elem2" element that was declared in the schema in FIG. 16. Note that the rule in FIG. 17 has a name of "burst_elem2". When the schema in FIG. 16 and content rules in FIG. 17 are checked into the repository, the system will modify the schema as shown in FIG. 18. A special annotation has been added to the elem2 definition at 1810 to indicate that the "burst_elem2" content rule is associated with this element.

FIG. 19 shows what an XML document based on the modified schema in FIG. 18 looks like after being edited in an editor with a CMS rule checking mechanism. In this example, it is assumed that the user has created a root element and then subsequently created elem1, elem2, and elem3 under the root. Notice that a new element, ProcessingResults, was inserted by the editor with a CMS rule checking mechanism. The insertion of the ProcessingResults element was the result of the editor reading the schema annotation for elem2, looking up the corresponding content rule burst_elem2, and determining that the rule had indeed been met. The editor subsequently generated the content of the ProcessingResults from processing the rule. In one suitable implementation, the CMS can simply read the ProcessingResults elements to know how to burst elem2 into its own object as the document is being streamed into the CMS.

In another suitable implementation, an editor with a CMS rule checking mechanism could have bursted the element immediately after checking the content rules such that the document could then be streamed directly into the repository. This implementation would provide the greatest performance increase that would be imperceptible to the user. Human response time offers a large portion of time that can be used. If the rule checking were performed at the client as the elements are being added by the user, the rule checking could be performed during the human response time thereby offloading the majority of the processing to the client during a time that would be unseen by the user. This would allow the document to be streamed directly into the repository further increasing the performance.

A content management system has an improved rule checking mechanism that analyzes a document for indications of which rules apply to the elements in the document. By annotating a document with the content rules that apply, the document may be streamed into a content management system with each element being checked against its corresponding content rules. In addition, the rule checking may be done on a client or elsewhere, and the document may include metadata that indicates whether or not the content rules were previously applied. The result is a CMS that performs rule checking in a very efficient manner by only checking the rules that actually apply to corresponding elements in a document.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

What is claimed is:

1. A networked computer system comprising:
(A) a client computer system comprising:
a first processor;
a first memory coupled to the first processor;

a plurality of content rules residing in the first memory, the plurality of content rules including at least one bursting rule, at least one linking rule, and at least one synchronization rule;

a document with a plurality of elements residing in the first memory, the document identifying in the document a mapping between each element and any corresponding content rules, the mapping specifying for each of the plurality of elements whether no content rule applies, whether a single content rule applies, or whether multiple content rules apply, and when a single content rule applies, the mapping identifies the single content rule that applies, and when multiple content rules apply, the mapping identifies the multiple content rules that apply;

an editor that determines which of the plurality of content rules apply to the plurality of elements in the document, and identifies in the document each element to which one of the plurality of content rules applies and each content rule that applies to the element by analyzing a schema for the document that includes an indication of which content rules, if any, apply to each element in the schema, the editor checking each element in the document against any corresponding content rules that apply according to the schema, and when the editor determines all elements in the document satisfy all corresponding content rules, the editor writes metadata to the document indicating the document has already been checked against the corresponding content rules; and (B) a server computer system coupled via network to the client computer system, the server computer system comprising:

a second processor;

a second memory coupled to the second processor;

a repository of documents residing in the second memory;

a content management system residing in the second memory and executed by the second processor, the content management system receiving the document from the client computer system to be checked into the repository, the content management system comprising a rule checking mechanism that determines from the metadata in the document whether content in the document needs to be checked against the plurality of content rules, and when the metadata in the document indicates the document has already been checked against the corresponding content rules, the content management system checks the document into the repository without checking the document against the corresponding content rules identified in the document.

2. A computer-implemented method for checking content in a document against a plurality of content rules, wherein the document identifies in the document at least one corresponding content rule for each element to which one of the plurality of content rules applies, the method comprising the steps of:

(A) an editor in a client computer system determining whether content in the document needs to be checked against the plurality of content rules, the plurality of content rules including at least one bursting rule, at least one linking rule, and at least one synchronization rule;

(B) when content in the document needs to be checked against the plurality of content rules, the editor in the client computer system determining from the document each element that has at least one corresponding content rule identified in the document from a mapping in the document between each element and any corresponding content rules, the mapping specifying for each of the plurality of elements whether no content rule applies, whether a single content rule applies, or whether multiple content rules apply, and when a single content rule applies, the mapping identifies the single content rule that applies, and when multiple content rules apply, the mapping identifies the multiple content rules that apply;

(C) the editor determining which of the plurality of content rules apply to the plurality of elements in the document, and identifying in the document each element to which one of the plurality of content rules applies and each content rule that applies to the element by analyzing a schema for the document that includes an indication of which content rules, if any, apply to each element in the schema, the editor checking each element in the document against any corresponding content rules that apply according to the schema, and when the editor determines all elements in the document satisfy all corresponding content rules, the editor writes metadata to the document indicating the document has already been checked against the corresponding content rules;

(D) the client computer system sending the document to a content management system in a server computer system, the content management system comprising a repository of documents;

(E) the content management system receiving the document from the client computer system to be checked into the repository;

(F) the content management system determining from the metadata in the document whether content in the document needs to be checked against the plurality of content rules, and when the metadata in the document indicates the document has already been checked against the plurality of content rules, the content management system checks the document into the repository without checking the document against the corresponding content rules identified in the document.

3. A computer-implemented method for a content management system, the method comprising the steps of:

(A) reading a plurality of content rules, the plurality of content rules including at least one bursting rule, at least one linking rule, and at least one synchronization rule;

(B) reading a schema for a document that includes a plurality of elements;

(C) modifying the schema to indicate which of the plurality of content rules, if any, apply to each element in the schema using a mapping between each element and any corresponding content rules, the mapping specifying for each of the plurality of elements whether no content rule applies, whether a single content rule applies, or whether multiple content rules apply, and when a single content rule applies, the mapping identifies the single content rule that applies, and when multiple content rules apply, the mapping identifies the multiple content rules that apply;

(D) sending the modified schema and the plurality of content rules to a document editor on a client computer system;

(E) the document editor performing the steps of:

as an element is added to a selected document, the editor determines from the modified schema whether a corresponding content rule exists for the element;

if a corresponding content rule exists for the element, adding an indication in the selected document that identifies all corresponding content rules for the element;

(F) after the selected document has been generated in the editor and saved, the editor checking each element in the selected document against all corresponding content rules identified in the selected document;

(G) the editor writing metadata to the selected document to indicate the selected document has been checked against the corresponding content rules identified in the selected document;
(H) initiating the checking in of the document into a repository managed by the content management system;
(I) the content management system reading the metadata in the selected document written in step (G);
(J) the content management system not checking the plurality of elements in the selected documents against the corresponding content rules identified in the selected document; and
(K) the content management system checking the selected document into the repository.

4. An article of manufacture comprising:
(A) an editor for installation on a client computer system, the editor reading a document with a plurality of elements, the document identifying in the document a mapping between each element and any corresponding content rules, wherein the corresponding content rules include at least one bursting rule, at least one linking rule, and at least one synchronization rule, the mapping specifying for each of the plurality of elements whether no content rule applies, whether a single content rule applies, or whether multiple content rules apply, and when a single content rule applies, the mapping identifies the single content rule that applies, and when multiple content rules apply, the mapping identifies the multiple content rules that apply, wherein the editor determines which of the plurality of content rules apply to the plurality of elements in the document, and identifies in the document each element to which one of the plurality of content rules applies and each content rule that applies to the element by analyzing a schema for the document that includes an indication of which content rules, if any, apply to each element in the schema, the editor checking each element in the document against any corresponding content rules that apply according to the schema, and when the editor determines all elements in the document satisfy all corresponding content rules, the editor writes metadata to the document indicating the document has already been checked against the corresponding content rules;
(B) a content management system for installation on a server computer system coupled via network to the client computer system, the content management system receiving the document from the editor to be checked into a repository of documents managed by the content management system, the content management system comprising:
a rule checking mechanism that determines from the metadata in the document whether content in a document needs to be checked against the plurality of content rules, and when a single content rule applies, the mapping identifies the single content rule that applies, and when multiple content rules apply, the mapping identifies the multiple content rules that apply and when the metadata in the document indicates the document has already been checked against the corresponding content rules, the content management system checks the document into the repository without checking the document against the corresponding content rules identified in the document; and
(C) computer-readable recordable media bearing the editor and the content management system.

* * * * *